US 6,594,273 B1

(12) United States Patent
McGibney

(10) Patent No.: US 6,594,273 B1
(45) Date of Patent: Jul. 15, 2003

(54) SELF-CONFIGURING RADIO NETWORK

(75) Inventor: Grant McGibney, Calgary (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/350,215

(22) Filed: Jul. 9, 1999

(51) Int. Cl.⁷ ............................................. H04B 7/212
(52) U.S. Cl. ...................................... 370/442; 370/336
(58) Field of Search ............................... 370/442, 310.2, 370/312, 313, 314, 315, 316, 321, 324, 326, 328, 329, 330, 334, 336, 337, 345, 347, 350, 389, 432, 401, 402, 404; 455/428, 416, 415, 502, 503

(56) References Cited

U.S. PATENT DOCUMENTS

| | | | |
|---|---|---|---|
| 4,939,726 A | | 7/1990 | Flammer et al. ........... 370/94.1 |
| 5,488,608 A | | 1/1996 | Flammer, III ............ 370/85.13 |
| 5,812,547 A | | 9/1998 | Benzimra et al. ........... 370/350 |
| 5,875,179 A | | 2/1999 | Tikalsky ..................... 370/315 |
| 5,887,022 A | | 3/1999 | Lee et al. .................... 375/202 |
| 5,987,011 A | * | 11/1999 | Toh ............................. 370/331 |
| 6,104,712 A | * | 8/2000 | Robert et al. ............... 370/389 |
| 6,108,314 A | * | 8/2000 | Jones et al. ................. 370/294 |
| 6,243,573 B1 | * | 6/2001 | Jacklin ........................ 455/416 |
| 6,331,973 B1 | * | 12/2001 | Young et al. ............... 370/337 |

OTHER PUBLICATIONS

United States Patent Application No. 09/275,981, entitled "An Analog Radio System with Acoustic Transmission Properties," by inventor Grant McGibney, filed Mar. 25, 1999.

Peer–to–Peer Wireless System, Wilson Pak–Wang Lee, M.Sc. Thesis, The University of Calgary, Jul., 1996, 63 pages, double sided.

A Peer–to–Peer Wireless System Designed for Local Communications in Rural Areas, Wilson P. Lee and Michel Fattouche, Wireless 96 Conference, pp. 1304–313, Jul. 8–10, 1996.

Hyperactive Chipmunk Radio, G.H. McGibney and S.T. Nichols, Wireless 98 Conference, pp. 279–287, Jul. 6–8, 1998.

* cited by examiner

*Primary Examiner*—David Vincent
*Assistant Examiner*—Phirin Sam
(74) *Attorney, Agent, or Firm*—Christensen O'Connor Johnson Kindness PLLC

(57) ABSTRACT

The invention is a radio terminal that co-ordinates with similar terminals around it to form a time division multiple access (TDMA) network. No base station or special devices are needed to manage the network. The terminals autonomously establish the critical functions that form the backbone of the network including routing and synchronization. Once established, any terminal can send radio messages through the network using any modulation format, analogue or digital, that meets the network's bandwidth, timing, and power specification. Terminals are able to reach destinations beyond their range by routing signals through neighboring terminals. The routing algorithm is simplified considerably by exploiting the broadcast nature of radio waves and allowing the signal to take more than one path through the network at the same time. For network synchronization, each terminal acts as both a slave, locking its clock frequency to the rest of the network, and a master, pushing the network frequency to match its own reference. In a simplified embodiment of the invention, the terminal accesses the network but does not participate in routing or synchronization. This allows battery-powered devices such as handheld terminals to access the network.

24 Claims, 16 Drawing Sheets

SELF-CONFIGURING RADIO NETWORK

FIELD OF THE INVENTION

This invention relates to telecommunications networks, and more particularly the routing of signals and synchronization of terminals within a telecommunications network.

BACKGROUND OF THE INVENTION

Most radio networks require some form of infrastructure. In the case of cellular and PCS phones, the infrastructure is in the base stations and the underlying network. For cordless phones, the twisted-pair telephone system provides the infrastructure. Other radio networks, such as the push-to-talk citizen's band system, don't require infrastructure but only supply a rudimentary service. In some instances where sophisticated voice and data networks are required the cost of installing infrastructure is prohibitive, only a temporary network is required, or there is not enough time to set up infrastructure. Some examples are remote communities, remote industrial job sites, emergency sites, sporting events, and conventions.

The system described by Lee et al. in U.S. Pat. No. 5,887,022 describes a system where a set of radio terminals activated in a region will self-configure into a communications network. This effectively produces the infrastructure within the radio units themselves. A drawback of this system is that all of the terminals must be in direct radio contact with every other terminal in the network. Ideally, this should not be a restriction, and terminals should be able to route their signal through a network of other terminals to reach destinations beyond their own radio range. Many routing algorithms exist, but most are based on wire/fibre network topologies where the connections between nodes are fixed. Some, such as the system described by Falmmer in U.S. Pat. No. 5,448,608, requires configuration information to be manually entered into each terminal, in this case geographic co-ordinates. No routing algorithm exists for a truly ad-hoc wireless network.

SUMMARY OF THE INVENTION

This invention is a radio terminal that, when activated within reasonable proximity of similar radios, becomes part of a self-organizing communications network. There are two classes of terminals in the network: active terminals and passive terminals. The active terminals form the backbone of the network by synchronizing to each other and establishing a common time domain multiple access (TDMA) frame in which all communication occurs. The active terminals also act as a network routers, forwarding signals between terminals that are too far apart to communicate directly. Passive terminals are simpler devices that can access the network but don't participate in routing or synchronization. Battery powered devices are usually passive to conserve energy.

The network is designed so that no one terminal is critical for any network function, and therefore a failure in any terminal will not disrupt the remainder of the network. The network does not impose any specific modulation format on the signals passing through it. Any signal, analogue or digital that meets the network's frequency, timing, and power specifications can be sent. On top of the networking base established by the terminals, a system can be built with whatever modulation formats, access protocols, congestion controls, addressing modes, etc. that the specific application requires.

Providing local communications to a small village is one example of how this invention can be applied. Each house in the village would have at least one active terminal that supports its part of the network backbone, as well as providing interfaces and connectors for wired devices within the home such as fixed telephones and computers. A household may also have one or more passive terminals like cordless phones and portable computers, which are able to roam throughout the community using any part of the network. The network time would be divided between one critical based protocol that handles the village's local telephone system needs and a separate packet based protocol that handles the village's data needs.

The active terminals divide the TDMA frame into a series of time slots. Some of the slots are designated data slots for carrying information between terminals, and others are designated synchronization slots. The data slots are further divided into sub-slots to accommodate routing. The source terminals transmits its signal during the first sub-slot and the remaining active terminals in the network use the following sub-slots to route the signal through the network.

The method of routing signals from source to destination used by this invention is different than the method of routing signals through a conventional cable or fiber network. A conventional network is composed of routing nodes with fixed links between the nodes. The nodes contain routing tables that direct the traffic to the appropriate links and the signal takes one path from the source to the destination. In this invention, the signal is allowed to take many paths through the network simultaneously. This method does not require routing tables and simplifies the routing algorithms considerably.

The routing algorithm works as follows. In the first sub-slot, the source terminal transmits the signal to the neighbouring terminals within its range. These terminals simultaneously rebroadcast it in the second sub-slot. The repeated signals reach both back towards the source terminal and further into the network, beyond the source terminal's original range. The part that goes back towards the source is ignored, and the part that propagates further into the network is picked up by new terminals. These in turn rebroadcast it in the third sub-slot. With each successive rebroadcast, the signal is pushed further out into the network until it reaches every terminal, including the destination.

Such a routing scheme requires that each terminal have its TDMA slot and sub-slot boundaries synchronized to every other terminal in the network. Normally a single master clock sets the pace of the TDMA frame and rest of the radio terminals contain slave clocks that lock to this master. Since this particular network must operate without a base station or network controller, it does not have a single master clock. Instead all of the active terminals behave as both slave clocks and master clocks simultaneously to achieve network synchronization. All active teminals simultaneously transmit identical signals during special synchronization slots set aside in the TDMA frame. At random intervals, each terminal disables its transmitter and listens to the synchronization signals from the other terminals in order to measure and correct the time offset of its clock with respect to the rest of the network.

The function of the master clock is distributed throughout all of the active terminals. Each terminal measures the frequency offset between its internal reference clock and the rest of the network and then tries to move the frequency of the network toward its reference. The terminals do not try to influence the speed of the network directly by adjusting the frequency of their internal clocks; instead they influence the speed of the network indirectly by adjusting the transmission time of their synchronization signals. If a terminal transmits its synchronization signal earlier than usual, then the rest of the network will react by speeding up. If it transmits later, the rest of the network will react by slowing down. Effectively, each terminal applies a synchronization "force" to the rest of the network. When the forces pushing to go slower balance the forces pushing to go faster, the network assumes a stable frequency.

These and other aspects of the invention are found in the detailed description and the claims that follow.

BRIEF DESCRIPTION OF THE DRAWINGS

There will now be described preferred embodiments of the invention, for the purposes of illustration only and without intending to limit the generality of the claims, with reference to the drawings, in which like reference characters denote like elements and in which:

DETAILED DESCRIPTION OF PREFERRED EMBODIMENTS

Figure 1:
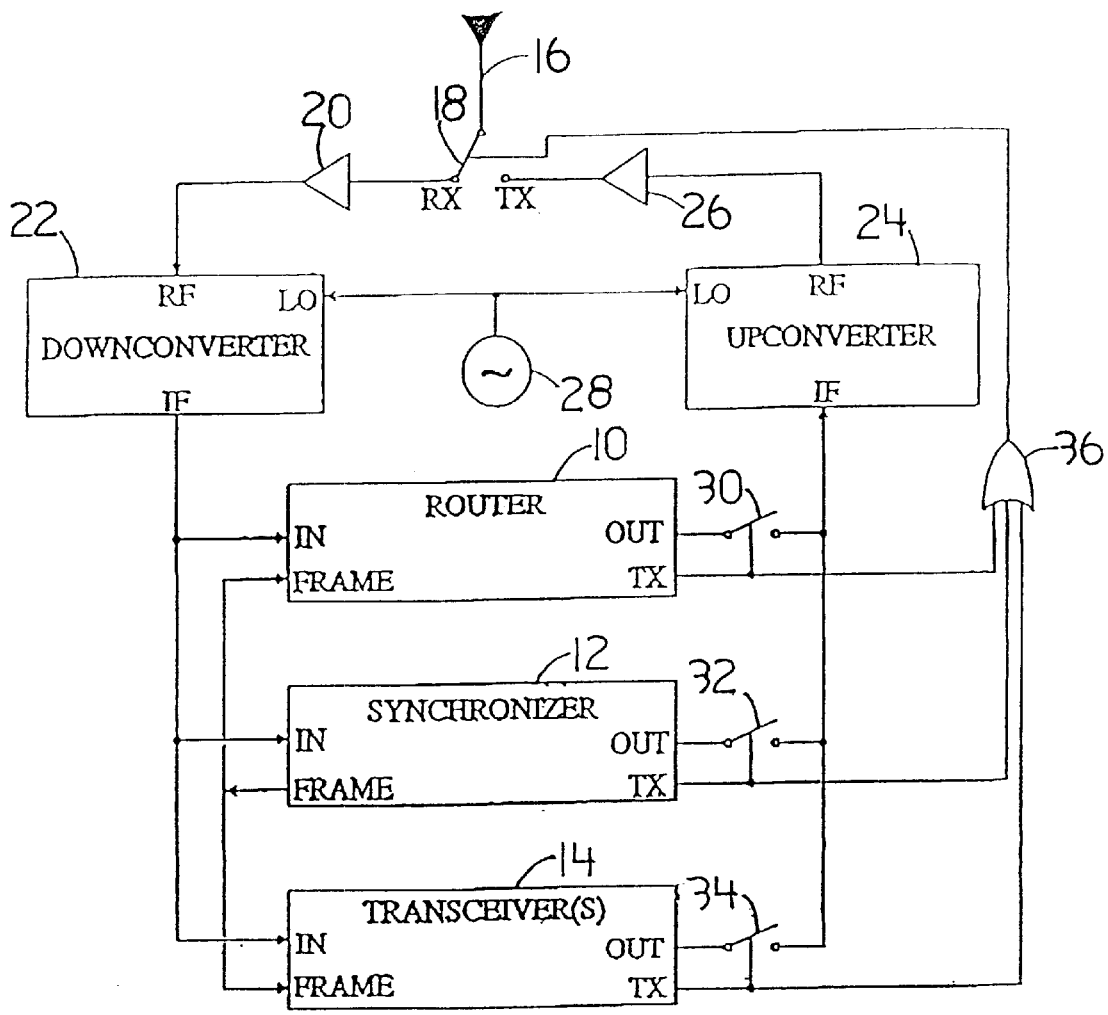
FIG. 1 is the schematic of the active terminal embodiment of the invention.

FIG. 1 shows the preferred embodiment of an active terminal. Each terminal consists of three major components: the router 10, the synchronizer 12 and one or more transceivers 14. Radio signals that reach the terminal are picked up by antenna 16 and passed through a duplex switch 18 that is normally in the receive (RX) position. The signals are amplified by a low noise amplifier 20 before reaching the downconverter module 22. The downconverter reduces the carrier frequency of the signal to a common intermediate frequency (IF) used by the rest of the radio and removes the out-of-band signals. The IF signal is simultaneously passed to the router 10, synchronizer 12, and transceiver 14. The output of the three major modules are passed to the upconverter 24 where the frequency is shifted back up to the radio frequency band, amplified by a power amplifier 26, and then broadcast at the antenna 16 via the duplex switch 18. Both the upconverter and the downconverter use a common local oscillator (LO) 28.

Figure 2:
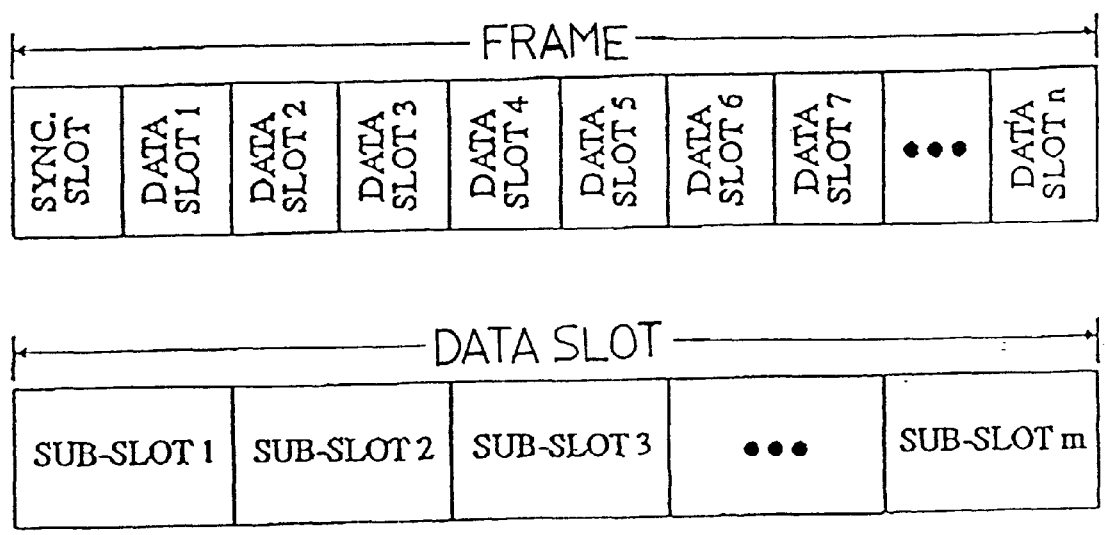
FIG. 2 shows the structure of the TDMA time frame.

The radio channel is shared between terminals and between modules within the terminal by time division multiple access (TDMA). The network time is divided into a continuous series of frames, each frame with a structure as shown in FIG. 2. The first time slot in each frame is used for synchronization signals and the remainder are data slots for carrying information between terminals. To accommodate routing, each data slot is further divided into sub-slots. The transceiver module 14 transmits its signal during the first sub-slot and the router modules 10 in the remaining active terminals use the following sub-slots to route the signal through the network to its destination.

The router module's function is to rebroadcast signals from neighboring terminals in order to extend their range. After the router 10 receives a signal at its input (IN) that is to be forwarded, it asserts its transmit (TX) line and repeats the same signal at its output (OUT) in the following sub-slot. The TX line causes switch 30 to connect the router to the upconverter, and passes through OR gate 36 to cause the duplex switch 18 to connect the antenna 16 to the power amplifier 26. The router does not try to interpret the signal in any way, it simply rebroadcasts the signal exactly as it was received. Signals may be routed through several hops, with one sub-slot for each hop, in order to reach destination far outside the source terminal's original range.

The synchronizer module 12 has a double role. It must listen to signals from the other radios during the synchronization slot and adjust the radio's frame clock to match the rest of the network. From this, it generates a FRAME signal whose rising edge marks the beginning of each TDMA frame for the router 10 and the transceiver 14. The synchronizer must also generate synchronization signals for the other radios in the network and in doing so, help set the pace of the TDMA frame for the entire network. When transmitting its synchronization signal, it asserts the transmit (TX) line to connect its output to the upconverter 24 via switch 32 and to connect the antenna 16 to the power amplifier 26 via switch 18.

The transceiver module 14 is what this terminal uses to communicate with other terminals in the network. In general, there may be more than one radio modulation scheme used within the network and the terminal may have more than one set of transceivers or one software based transceiver capable of communicating with several different radio formats. As with the other modules, the transceiver has a TX line which connects its output to the upconverter 24 via switch 34, and connects the antenna 16 to the power amplifier 26 via switch 18. The transceivers are only allowed to transmit during the first sub-slot of the data slots.

Figure 3:
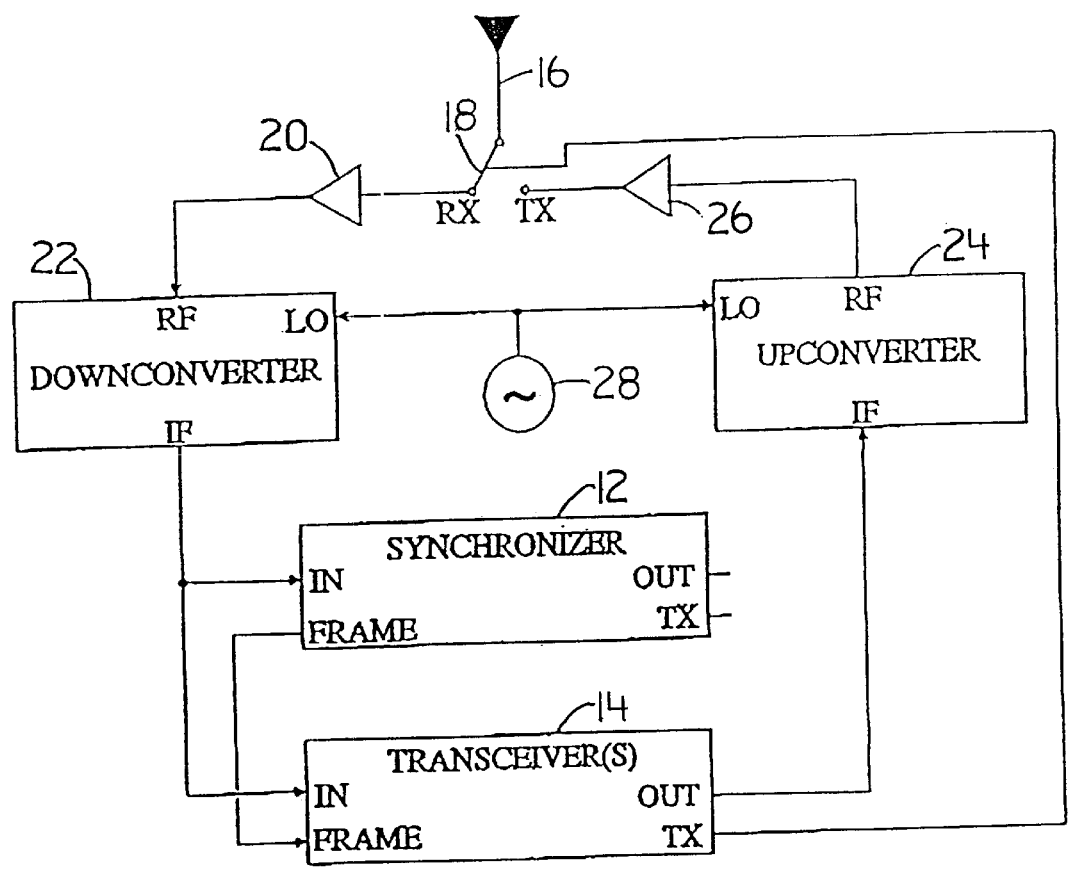
FIG. 3 is the schematic of the passive terminal embodiment of the invention.

For an active terminal, the routing and synchronization modules are always turned on, even when the terminal's local transceivers are inactive. This is a requirement to keep the rest of the network going. If the radio is small, battery powered device this is impractical as the routing and synchronization functions will quickly drain its limited energy resources. In this instance, the passive terminal embodiment shown in FIG. 3 is used. This is identical to the active terminal shown in FIG. 1 except that there is no router 10 and the synchronization module 12 is not allowed to transmit synchronization signals. The passive terminal only transmits its own data signals, which significantly reduces its power requirements.

Figure 4:
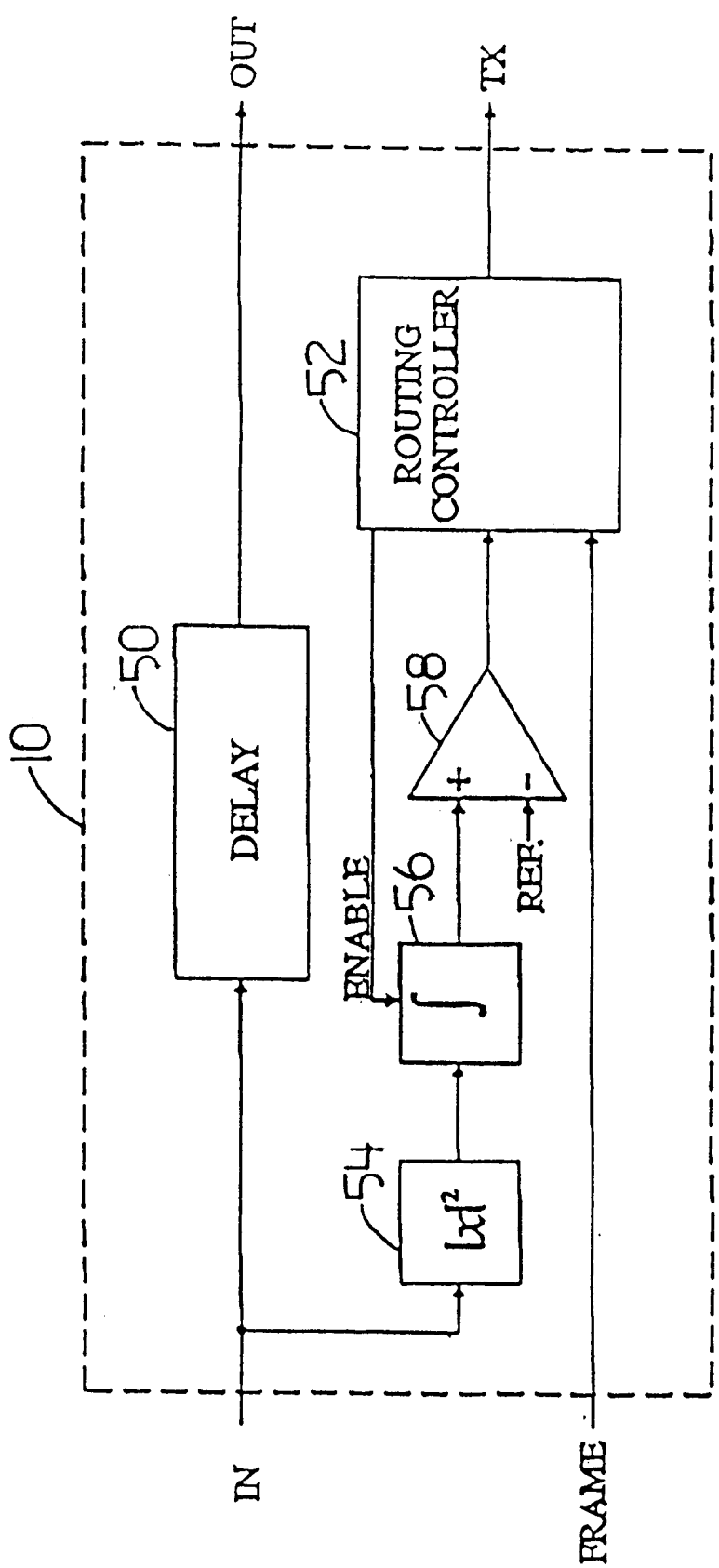
FIG. 4 is a schematic showing the details of the router module.

The details of the router module 10 are shown in FIG. 4. All signals arriving at the input (IN) pass through delay element 50, which has a delay equal to the length of one sub-slot, and are repeated in the next sub-slot at the output (OUT) line. In the preferred embodiment, the delay element is a surface acoustic wave (SAW) filter with a bandwidth greater than that of the signal and a uniform delay across the band. The routing controller 52 determines whether the signals on the output line are transmitted or not. The FRAME signal from the synchronizer 12 allows the controller 52 to determine where all the slot and sub-slot boundaries are. When the controller determines that a sub-slot should be forwarded, it asserts the TX line during the following sub-slot while the delayed version of that signal is being sent through the OUT line.

Figure 5:
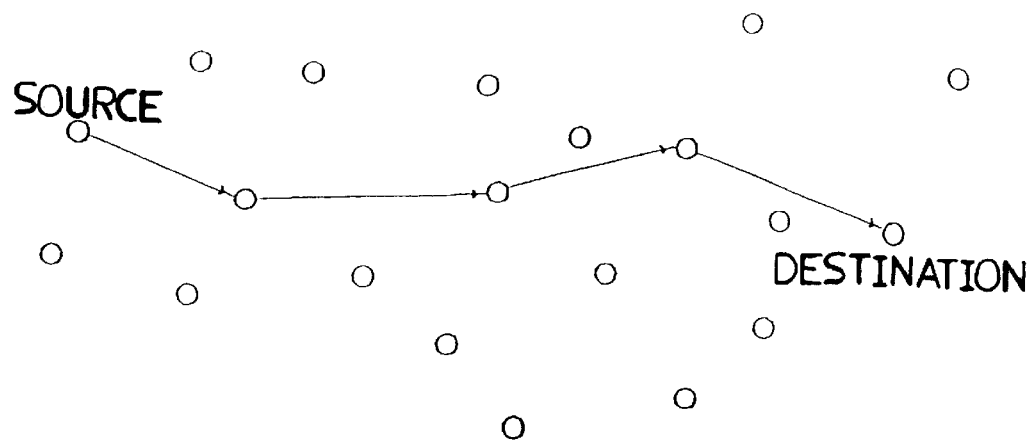
FIG. 5 is an example illustrating direct routing through network.

The algorithm that the routing controller 52 uses to assert the TX line determines how the signals are sent through the network. If wire/fibre networking practices were employed, the source terminal would recruit terminals between itself and the destination to act as routers, as shown in FIG. 5. The source would transmit to the first router during the first sub-slot, which would in turn transmit to the second router in the second sub-slot, and so fourth until the signal reaches the destination. While intuitively simple, this method has many disadvantages. To set up a routing path, each terminal must first become aware of its place within the network and the location of its neighboring terminals. Routing tables must then be established in each terminal. This requires a tremendous amount of co-ordination and communication amongst the terminals, plus the network would need to be able to reconfigure itself quickly as terminals move about the village. Another disadvantage is that every terminal is a critical node for all the signals that pass through it, and that one terminal's failure would severely affect the network.

Figure 6:
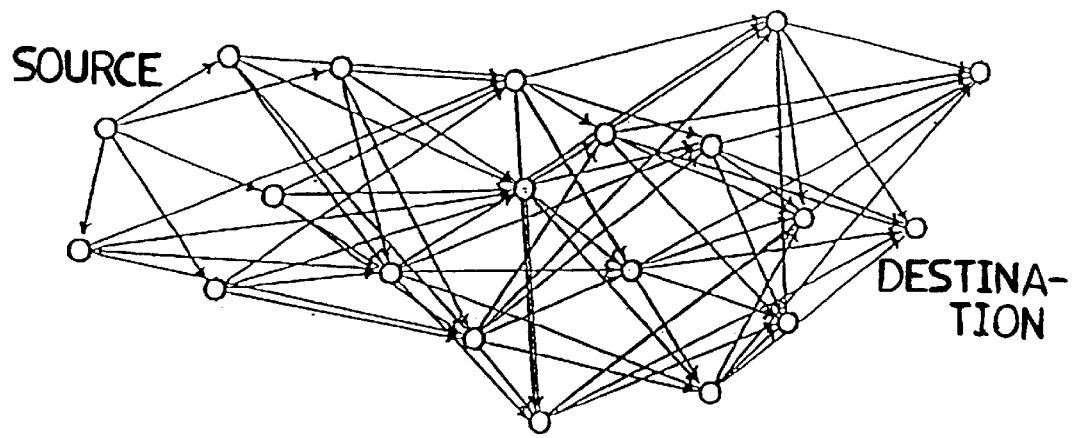
FIG. 6 is an example illustrating multipath routing through a network.
Figure 7A:
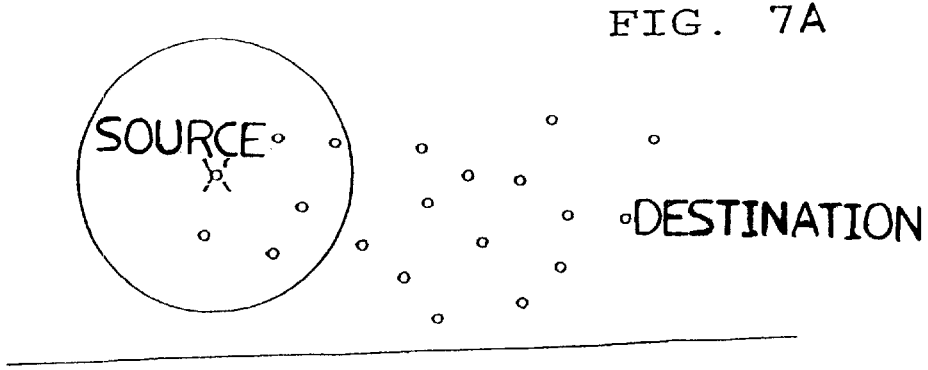
FIG. 7A shows the progress of a signal through the network in the first sub-slot.
Figure 7B:
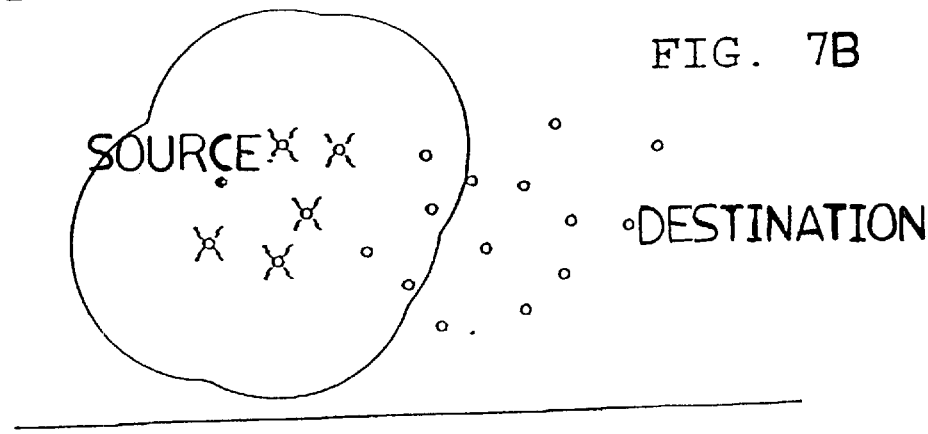
FIG. 7B shows the progress of a signal through the network in the second sub-slot.
Figure 7C:
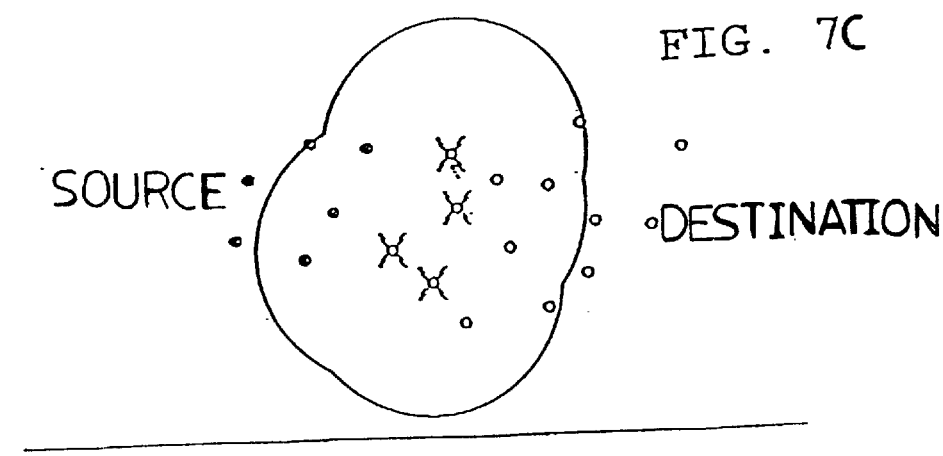
FIG. 7C shows the progress of a signal through the network in the third sub-slot.
Figure 7D:
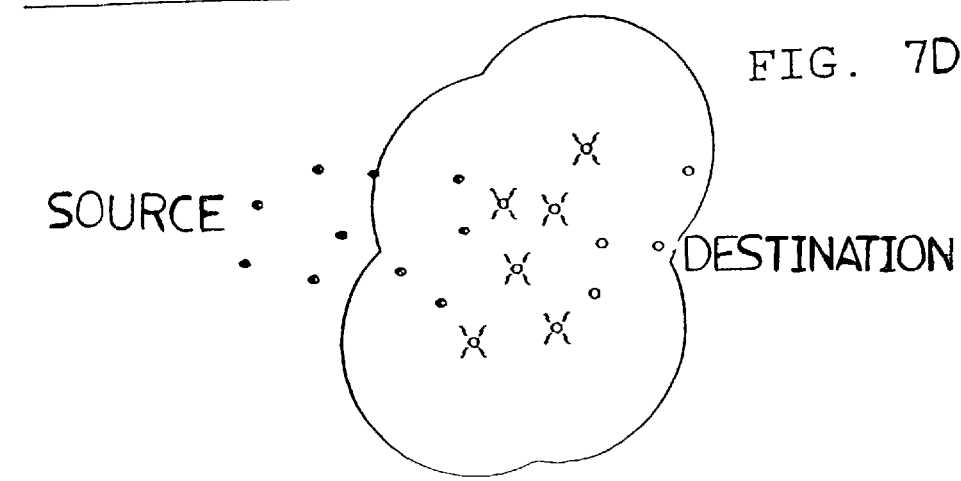
FIG. 7D shows the progress of a signal through the network in the fourth sub-slot.

To decrease the complexity of the network and increase its robustness, signals are allowed to take multiple paths through the network as shown in FIG. 6. In this particular example, the signal travels through the network simultaneously through 120 different paths. The multipath network does distort the signal, but it does so in a way that is similar to the distortion that occurs in a normal multipath radio channel. The signal that arrives at the destination is a composite of the signals through each path. Signals that pass through longer paths in the network tend to arrive later with smaller amplitudes than the signals that pass through shorter paths. In addition, the individual links in the network are themselves multipath radio channels, which adds to the number of paths in the overall signal.

Multipath channels have the advantage of built in redundancy. In a multipath radio channel, if any of the individual paths are blocked (including the direct path) the remaining paths will still carry the signal to the destination. This same effect applies to the multipath network. If one terminal is turned off, moved, or breaks down, there are normally enough parts remaining in the network to continue communications without disruption. The disadvantages of multipath channels, most notably flat and frequency selective fading, can be handled by a number of different wideband communication techniques including spread spectrum, multicarrier modulation (OFDM), and equalization.

The set of paths shown in FIG. 6 were generated by applying three rules in the routing controller 52:
1. When the router detects sufficient signal energy in one sub-slot, it rebroadcasts a copy of the signal in the next sub-slot.
2. The router only rebroadcasts a signal once during any given slot.
3. The router does not rebroadcast a signal across slot boundaries.

The first rule tells the router to assert the TX line and forward a signal only if it has enough energy to meet a given quality standard. The source terminal transmits its signal in the first sub-slot and the energy in that signal is picked up by the active terminals within its range. These terminals simultaneously retransmit the signal in the next sub-slot to a larger range. The terminals within the larger range retransmit the signal in the next sub-slot and so on until the signal reaches all parts of the network. The second rule forces the signal to only propagate away from the source terminal as it progresses through the network by preventing any one router from forwarding the same signal twice. This eliminates the possibility of closed routing loops within the network. The last rule is used to extinguish a signal after it reaches the end of its time slot. This prevents any signal from circulating through the network in perpetuity.

Figure 4A:
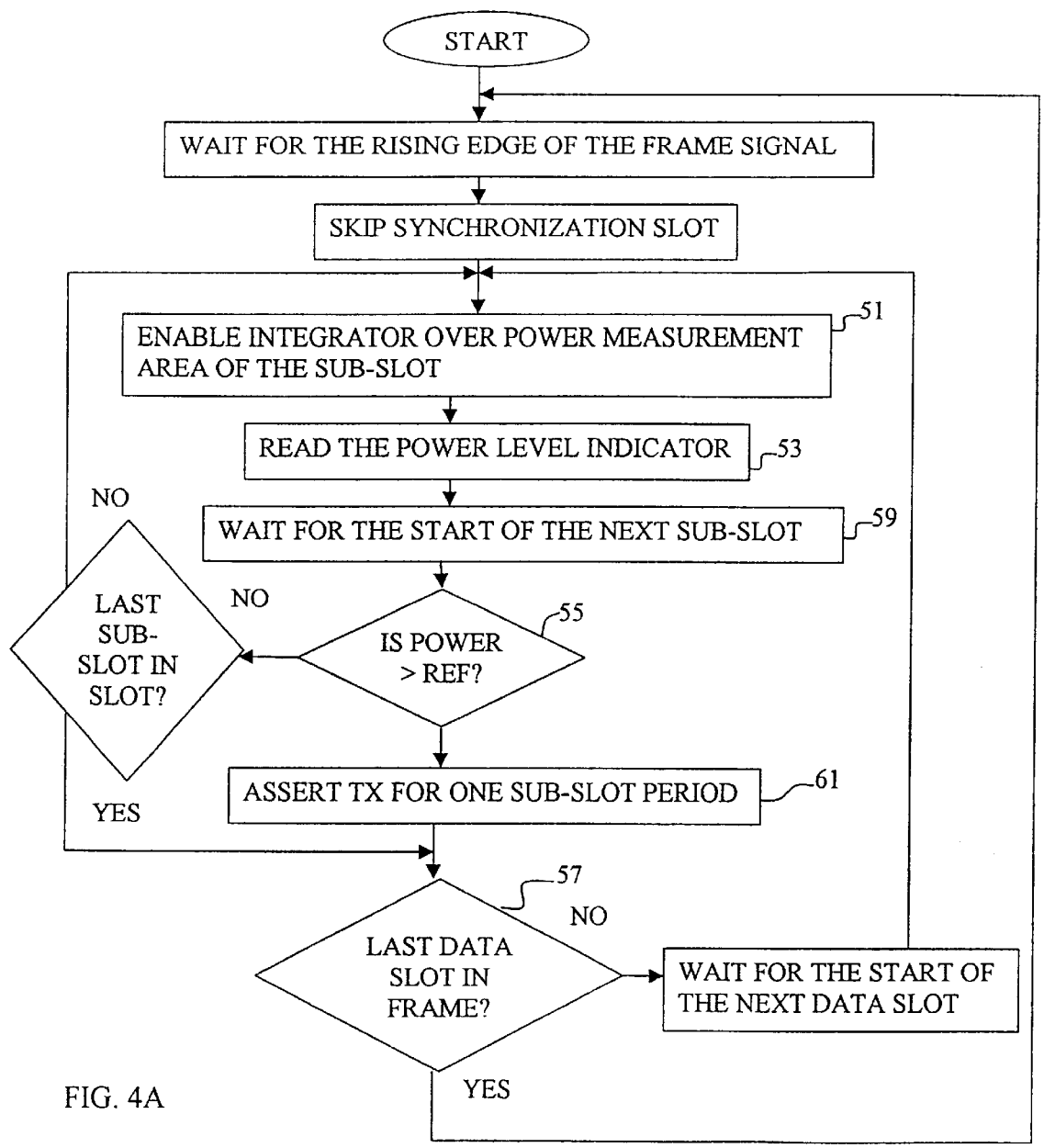
FIG. 4A is a flow diagram showing operation of the router.

FIG. 4A shows operation of the router. When idle, the router waits for the rising edge of the FRAME signal, and upon receipt of the FRAME signal, skips the synchronization slot. The integrator 56 is enabled at 51 to measure over the sub-slot, then the power level indicator is read at 53 and then the router waits for the start of the next sub-slot at 59. A decision is made at 55. If the power is greater than reference, then the TX signal is asserted for one sub-slot period, and if not, then the router checks to see of this is the last sub-slot. If not, the router begins again with enabling of the integrator at 51, and if this is the last sub-clot in a slot, then goes to decision 57. If the power is greater than the reference level, then the TX is asserted for one sub-slot at 61. Due to the delay at 59, the signal will be delayed one sub-slot. After assertion of TX, or after the last sub-slot in the slot, the router checks to see if this is the last data slot in the frame at 57. If not, then the router returns to 51, and if this is the last data slot, then the router waits again for the rising edge of the frame signal.

FIG. 7 demonstrates how these router rules are applied to achieve the network in FIG. 6. In the first sub-slot (FIG. 7a) the source terminal transmits its radio message. The circle delimits the range of the radio. The five terminals within range apply rule number one and determine that there is significant energy in the signal to rebroadcast it in the next sub-slot. In the second sub-slot (FIG. 7b), these five terminals simultaneously rebroadcast the original message. By rule 2, the source terminal can not transmit the signal again so it becomes inactive (as indicated by the "x" mark) for the rest of this time slot. Four new terminals are in range of the transmission during the second sub-slot. By the third sub-slot (FIG. 7c), six terminals are disabled by rule 2, four terminals are rebroadcasting the signal from the previous sub-slot, and six new terminals are within range. Finally, in the fourth sub-slot (FIG. 7d) the six transmitters reach the remaining terminals in the network including the destination.

This process of rebroadcasting the signal continues even after the signal has reached its destination. In FIG. 7, the four terminals that receive the signal in the fourth sub-slot would rebroadcast it in the fifth even though the signal has reached its destination and there are no other terminals to contact. The signal is terminated only when all of the terminals have transmitted the signal, in which case rule 2 prevents any further transmissions, or when all of the sub-slots within a time slot have been used up, in which case rule 3 terminates the signal. There should be enough sub-slots within each TDMA slot so that rule 3 seldom has to be used. It is intended only as an emergency stop to prevent the network from becoming unstable. If overused, signals may be cut off too early and be prevented from reaching their destination.

It is important to note that none of the three rules require that the routing controller 52 have any knowledge of the network or is place within the network. No routing tables or coordination between terminals is required. The router does not have to know the source or destination of the radio packet that it is forwarding. It does not need to know the format of the signal that it is forwarding. Terminals can be moved about the network without disrupting the network or forcing a reconfiguration. Also, because the signal travels through the different paths in parallel, the radio resources required for the multipath routing (FIG. 6) is identical to the more complex direct routing (FIG. 5)—both require four sub-slots in this example.

Routing decisions are based on power levels therefore there must be one component of every signal that acts as a power reference. Normally this would cover a fixed time range at the beginning of each sub-slot. To avoid flat fading through the network, the power reference component must also be wideband. Digital modulation schemes usually produce wideband signals with a consistent power level so no special modifications have to be made to meet this requirement. If the signal does not have such a property, then a wideband filler signal, such as a pseudo-noise sequence, can act as a power reference during this period. To measure the power level of the signal, the router 10 (as seen in FIG. 4) passes the signal through a square law detector 54 to measure the instantaneous signal power. During the power measurement time period, the routing controller 52 sends an ENABLE signal to an integrator 56 which produces as an output the total amount of signal energy during that time period. Comparator 58 asserts a line to the controller 52 if the total energy in the signal exceeds a given reference level established by rule 1.

When the transceiver module 14 decodes a signal that has passed through the multipath network it must choose which of the sub-slots contains the best copy of the signal. The selection is made by either picking the one with the strongest signal power, or by including a checksum in the signal and choosing the sub-slot that decodes without errors. More advanced receivers can increase their performance using path diversity. The receiver records the signal from two or more sub-slots, each of which takes a different path through the network, and combines the individual signals to produce one stronger signal.

Figure 8:
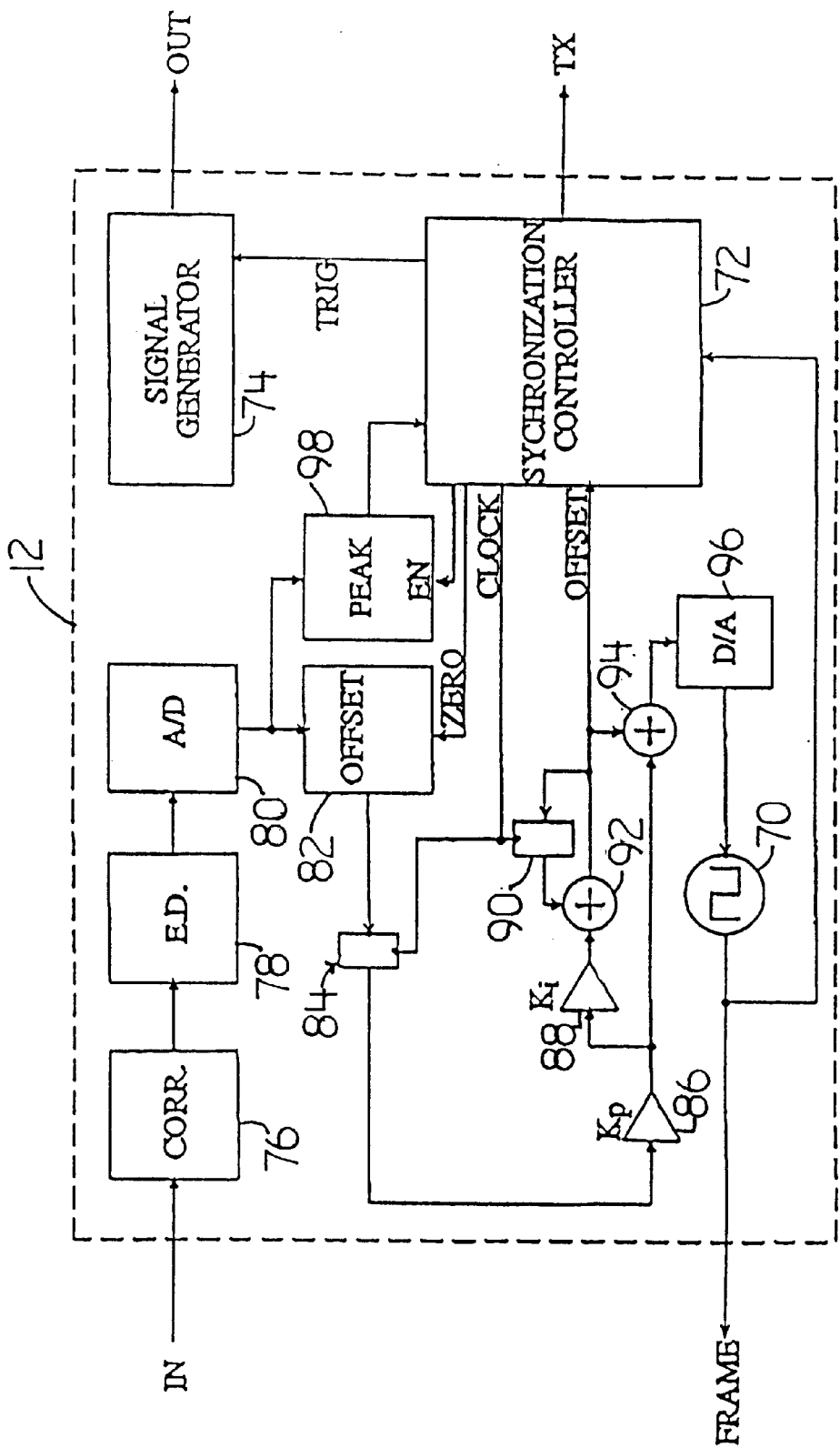
FIG. 8 is a schematic showing the details of the synchronization module.

The details of the synchronization module are shown in FIG. 8. The module adjusts a voltage controlled oscillator (VCO) 70 so that its riding edge occurs at the beginning of each TDMA frame. This marks the start of the frame for the synchronization controller 72 and the other modules through the FRAME line. The conventional method of implementing TDMA synchronization is to use a single master clock that marks the start of a frame with a fixed synchronization signal. That signal is picked up in each terminal and used to adjust a VCO (the slave clock) to track the master clock. This method is impractical for the network created by this invention. To do so would require that one terminal within the network be elected to be the master and the rest default to being slaves. Even if this could be accomplished autonomously, the master terminal would become critical and the entire network would fail if it were disrupted.

In this invention, the synchronization signal that marks the beginning of the TDMA frame is generated simultaneously from many active terminals. The precise frequency of the frame is determined communally so that the loss of any terminal will not bring down the network. In most synchronization slots, the controller 72 generates a trigger pulse (TRIG) to a signal generator 74 which, in turn, produces a synchronization signal on the output (OUT) line. At the same time it asserts the TX line to allow the synchronizer to transmit. The synchronization signal is a long pseudo random noise (PRN) signal that is modulated to the intermediate frequency. This signal has a relatively consistent power level when transmitted, but produces a strong pulse for a short period when correlated with itself. Synchronization signals must be the same in every terminal and they are not routed through the network.

At random intervals, the synchronization controller 72 does not assert the TX or TRIG signals during the synchronization slot so that it can listen to the signals from the rest of the network. The signal that appears at the synchronizer's input (IN) line is a composite of the synchronization signals from the other active terminals (minus any other terminals that happen to be listening at the time). The signal is passed through a correlator 76 to convert the PRN signals to short pulses. While several implementations of correlators are possible a surface acoustic waves (SAW) filter is preferable. It is a simple device and operated directly at the intermediate frequency. The signal is then passed through an envelope detector 78 to convert the IF pulses to baseband. At this point the signal represents a magnitude-delay profile of the other terminals in the network. Nearer terminals appear as stronger pulses sooner in the profile and farther terminals appear as weaker pulses later in the profile. The signal is then digitized by and analogue-to-digital converter 80 to produce the sample signals, $m_i$, where i is the time index. The magnitude-delay profile does not give a specific target time that the synchronizer can lock to because the signals from the other terminals arrive with different delays. Instead the synchronizer locks to the centroid of the magnitude-delay profile given by $$centroid = \frac{\sum_{i=-N}^{N} im_i}{\sum_{i=-N}^{N} m_i}.$$

The constant, N, defines the size of the observation window, which should be large enough to encompass the signals from all terminals. The synchronization controller 72 supplies a reference time to an offset calculation unit 82. This unit calculates the centroid of the magnitude-delay profile and compares it to the reference time and outputs the difference, which represents the timing error. This error value is then loaded int a latch 84 on a signal from the controller 72. The error is then passed to a standard proportional-integral feedback loop composed of multipliers 86 and 88, latch 90, and adders 92 and 94. The output of the feedback loop is converted back to an analogue signal by digital-to-analogue converter 96 to control the frequency of the voltage controlled oscillator 70 and force the timing error to zero. The synchronization modules in every terminal in the network, both active and passive, perform this function to join together in a common TDMA frame.

Even when the VCOs 70 of all the terminals are locked together, the overall network frequency in inherently unstable. As an illustration of the point, assume that there are two terminals in the network and they are spaced so that the signal takes 100 ns to travel from one to the other. Each terminal transmits a synchronization signal to the other, and both signals arrive 100 ns late because of the propagation delay. The synchronization circuits in each radio assume (incorrectly) that they are sampling early with respect to the network and attempt to correct this by slowing down its VCO. At the next synchronization pulse, both radios will have slowed down by the same amount and both radios will again measure the signals as being 100 ns late, prompting them to slow down the VCOs further. This process continues without bound, continuously slowing the VCOs until the network fails.

The solution to the instability problem is to allow each terminal to advance the timing of its synchronization signal (i.e. transmit the synchronization signal some time earlier than the start of the slot). The magnitude of the timing advance determines how the network frame frequency will behave. If the advance is less than the delay between terminals, as in the two-terminal example above, then the frequency will decrease uncontrollably. Make the timing advance more than the delay between terminals and the opposite will happen. The network frequency is stabilized by adding a feedback loop to each terminal that increases the timing advance as the frequency of the frame clock decreases. A 100 ns propagation delay between two terminals will still cause the frequency of both VCOs to go down, however, as the frequency goes down the timing advance of each terminal will increase. At some point, the timing advance will exactly equal and cancel the propagation delay between the terminals and the network frequency will stabilize. The synchronization controller 72 measures the frequency offset of the terminal at the output of the integral part of the feedback loop (i.e. the output of adder 92). It then advances the TRIG signal to the signal generator 74 in proportion to the measured offset.

In a network with more than two terminals, the correct value for the timing advance is not obvious since there is a different delay between every pair of terminals. The timing advance in this case can be thought of as a force that one terminal can use to influence the speed of the overall network—increase the timing advance of one terminal and the frequency of the entire network will be pushed slightly higher. All the terminals acting together pull the frequency of the network to a stable point where the forces from the terminals pushing the network to go faster balance the forces from the terminals pushing the network to go slower. The value of this network frequency will depend on the geometry of the network and will change as terminals come and go, but it will never increase or decrease out of control.

As mentioned above, the synchronizer listens to the signals from other terminals at random intervals. Ideally when the synchronizer makes its timing measurement, it should receive a signal from all the other active terminals. However, some of those terminals may be making their own timing measurement in the same frame and therefore not contributing to the signal. By making the timing measurements at random intervals, the set of terminals that are not transmitting changes at each measurement and no signal from any terminal is left out for long periods. This is in conflict with the timing feedback loop, which expects a periodic signal. As a compromise, the timing is sampled in a quasi-periodic manor. For example, a terminal could use a rough sampling period of ten frames but change that period by a random value that varies between minus two and plus two frames.

The peak detector 98 serves several roles. While enabled by the controller 72 the peak detector observes the samples coming from the analogue-to-digital converter 80. At the end of the enabled period it reports the largest value and its position back to the controller. When initially connecting to the network, the controller enables the peak detector for the entire TDMA frame in order to find the synchronization slot. Only the synchronization signal will correlate properly within the correlator 76 to produce a large pulse therefore the position of the peak signal corresponds to the start of the synchronization slot.

The peak detector 98 is also used to detect special conditions in the network that require different actions by the controller 72. One such condition is when there is no synchronization signal present. This can occur when the terminal is the only active terminal in the network, or when the network is very small and, by chance, all of the active terminals turn off their transmitters to listen to the synchronization signal at the same time. When there is no synchronization signal, the output of the offset calculation unit 82 is undefined and should not be used to set the timing. The controller 72 detects this condition by enabling the peak detector 98 during the synchronization slot and observing if any significant correlation peak is detected. If no peak is found, the clock signal connected to latches 84 and 92 is disabled so that the timing calculation is ignored and the frequency of the VCO 70 is held constant.

Another special condition occurs when a group of two or more closely spaced terminals forms. Within the group, the synchronization signals from the close neighbours are so much stronger than the signals from other terminals in the network that the rest of the network becomes insignificant. The group is then able to set its own pace and may break away from the rest of the network. The controller 72 avoid breakaway groups by disabling its TX line whenever the correlation peak, as reported by the peak detector 98, becomes too strong. For example, a new active terminal is turned on very close to an existing active terminal. The new terminal's synchronization module 12 will track only its close neighbour's synchronization signal, which overpowers the rest of the network because of its close proximity. Due to this signal's strength, the new terminal disables transmission of its own synchronization signal so that the neighbouring terminal can still detect the synchronization signals from the rest of the network. The neighbouring terminal continues to follow (and contribute to) the synchronization signals from the rest of the network, the new terminal follows its neighbour, and no breakaway group is formed. The new terminal continues to monitor the strength of the peak signal and will re-enable its TX line if the magnitude drops sufficiently (for example if the neighbouring terminal was moved away or turned off).

Figure 8A:
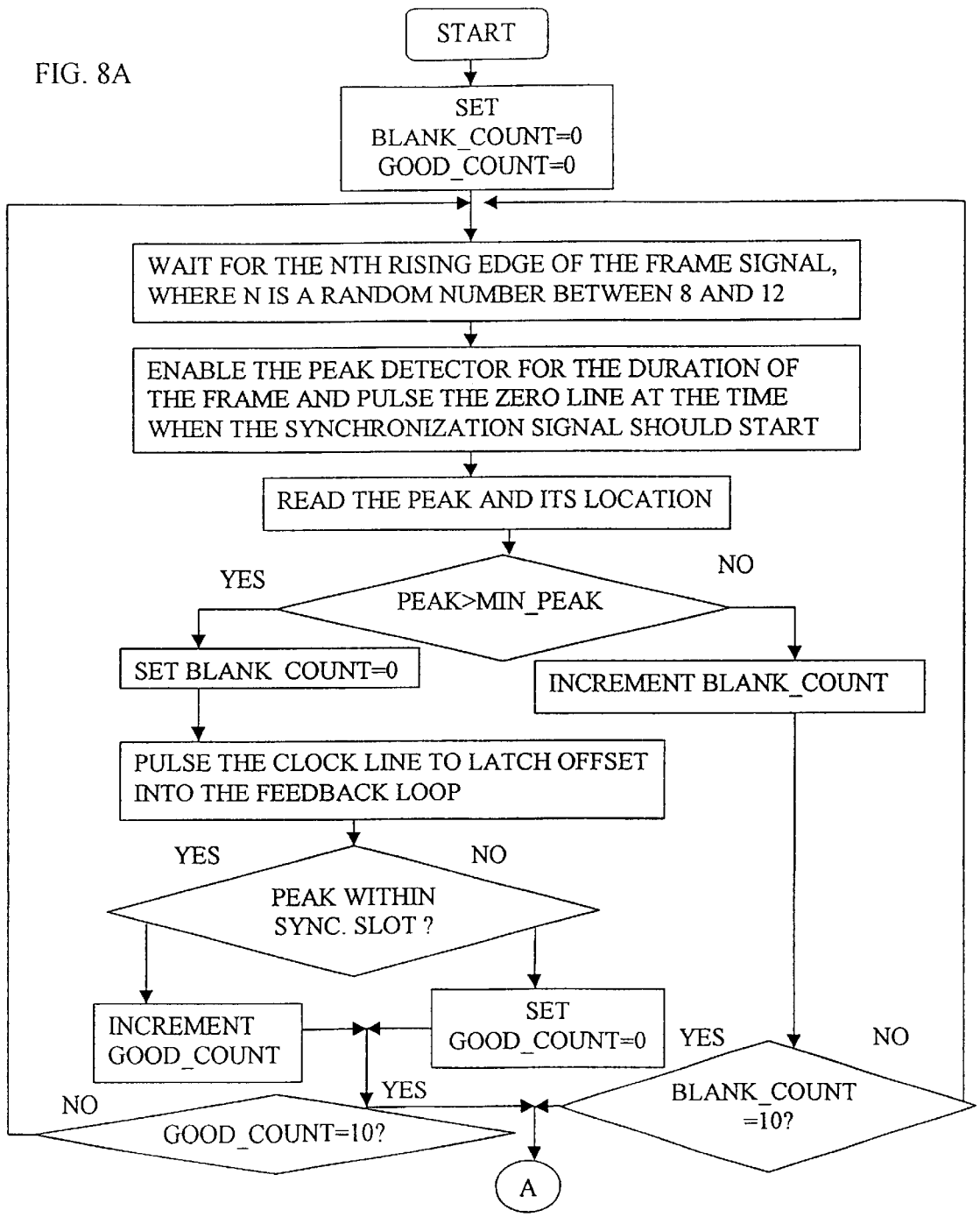
FIGS. 8A and 8B are flow diagrams showing operation of the synchronization module.

FIG. 8A shows the flow chart for the synchronization controller 72 while it is in its initialization phase. At this time the synchronizer is searching for a signal from the rest of the network and not contributing a synchronization signal of its own. Initially, BLANK_COUNT and GOOD_COUNT are set to zero. The synchronizer waits for the nth rising edge of the frame signal where n is a random number between (for example) 8 and 12. The peak detector is then enabled for the duration of the frame and the zero line is pulsed at the time when the synchronization signal should start. The peak and its location are then read. If the peak is too low, lower than a MIN_PEAK reference, then BLANK_COUNT is incremented, and the synchronizer checks whether BLANK_COUNT is equal to 10. The initialization loop exits when ten consecutive frames (as recorded by the variable BLANK_COUNT) are recorded with no correlation peaks that meet the minimum standard given by the reference level, MIN_PEAK. In this case the synchronizer assumes that no network exists and it starts a new network. If correlation peaks are found that meet the MIN_PEAK standard then the timing feedback loop is activated. BL;ANK_COUNT is reset to zero. The clock line is pulsed to latch the offset into the feedback loop. Next, a decision is made. If the peak is within the sync slot, then GOOD_COUNT is incremented, otherwise GOOD_COUNT is set to zero. When ten consecutive correlation peaks (as measured by GOOD_COUNT) are measured within the synchronization slot, the controller assumes that the synchronization signal is locked and stabilized and exits the initialization loop.

Figure 8B:
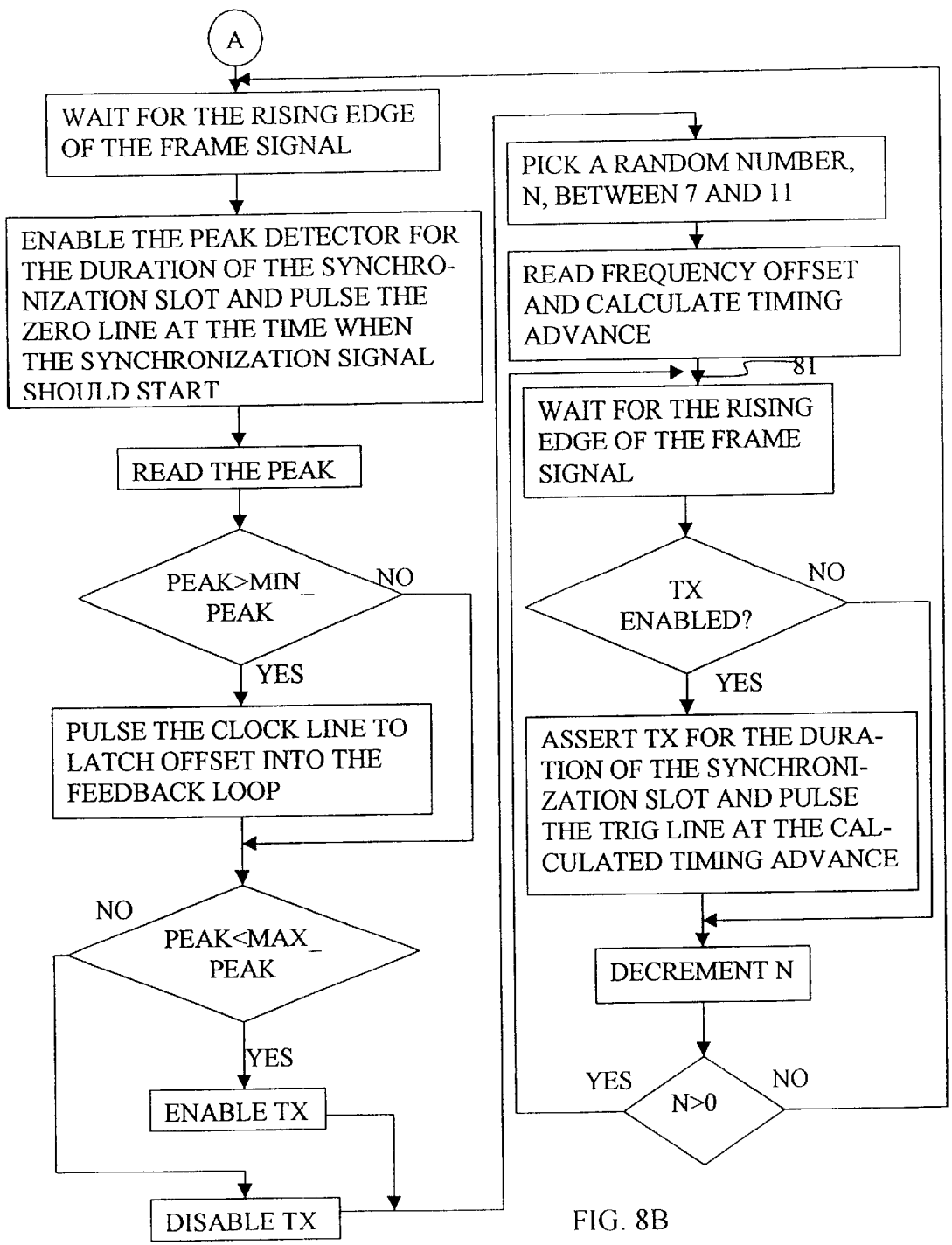

FIG. 8B shows the flow chart for the synchronization controller 72 in its running phase. In this phase the synchronizer alternates between listening to synchronization signals and transmitting synchronization signals. In the same way as during the initialization phase, the synchronizer 72 waits for the rising edge of the FRAME signal, enables the peak detector, reads the peak and compares it to a minimum threshold MIN_PEAK. If the peak is greater than threshold, the offset is latched into the feedback loop. The synchronizer 72 then determines whether the peak is less than a maximum threshold MAX_PEAK. When the peak correlation value exceeds the threshold, MAX_PEAK, the controller assumes that another terminal is in close proximity and disables transmission (TX) of its own synchronization signals. Next, a random number, n, between 7 and 11 is picked, the frequency offset is read the timing advance calculated as described above. The synchronizer 72 then awaits for the rising edge of the frame signal at 81. If TX is enabled, then TX is asserted for the duration of the synchronization slot and the TRIG line is pulsed at the calculated timing advance. If TX is not enabled, the synchronizer 72 skips assertion of TX for the duration of the sync slot. Next, n is decremented. If N is greater than zero, the synchronizer agains waits for the rising edge of the frame signal and repeats the steps from 81, until N is zero when it returns to the beginning of the running phase.

The signal format used in the transceiver 14 can vary depending on the application of the invention. The signal must fit within the bandwidth of the radio channel and the time length of a single sub-slot. It must use a modulation scheme that is tolerant of the frequency selective multipath fading encountered in both the radio channels and the network itself. It must also contain a region that can be used as a power reference by the routing algorithm. The preferred modulation method for transferring digital data is orthogonal frequency division multiplexing (OFDM), also known as multicarrier modulation. For voice transmission, hyperactive chipmunk modulation is preferred.

Figure 9:
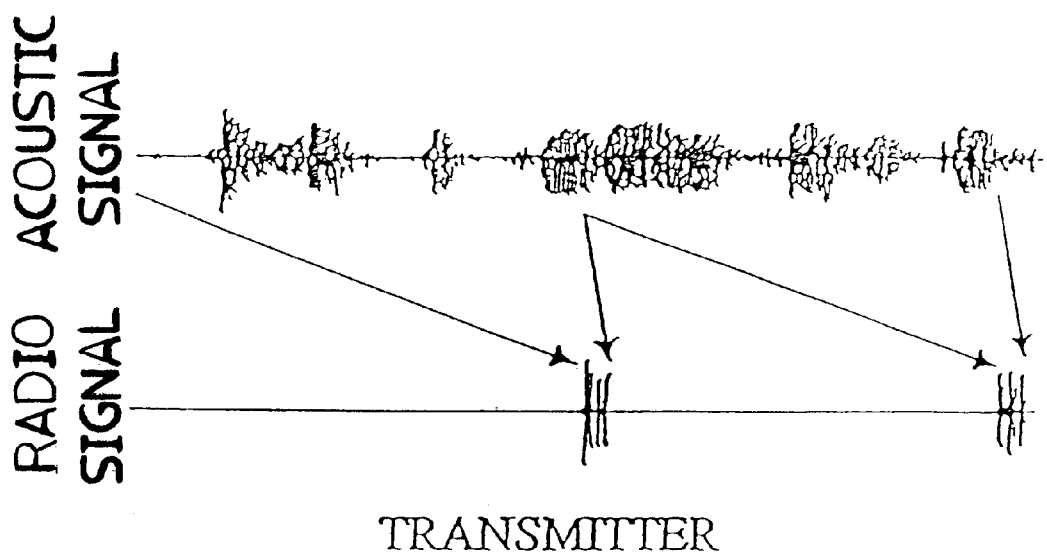
FIG. 9 illustrates time compression operation in the transmitter in a preferred embodiment of this invention for voice transmission and the corresponding time compression operation in the receiver.
Figure 9:
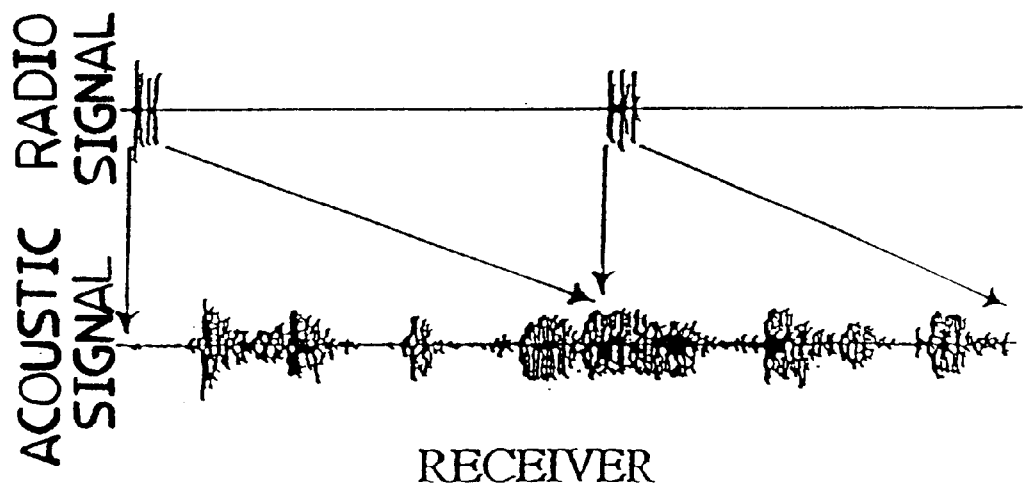
Figure 10:
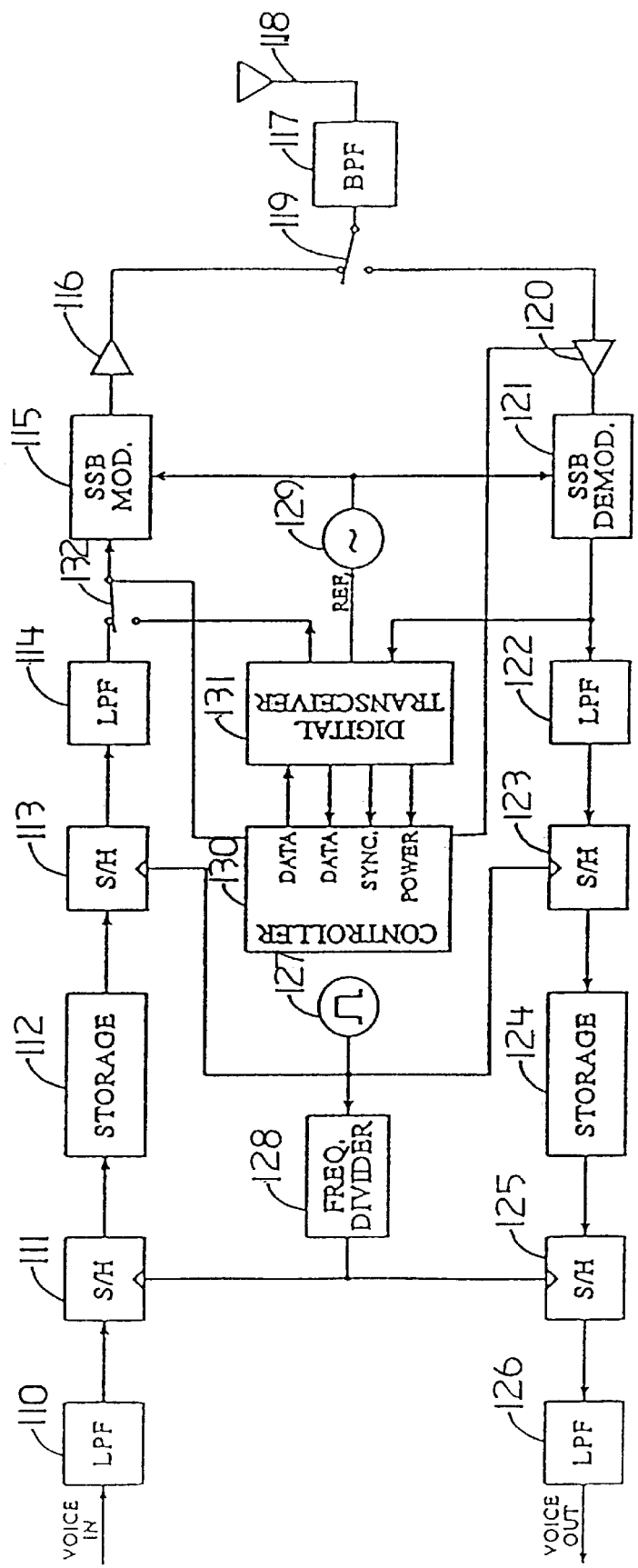
FIG. 10 is a schematic of the preferred voice transmission embodiment of this invention.

The operation of the hyperactive chipmunk transmitter and receiver are shown in FIG. 9 and the apparatus that performs the operations in FIG. 10. The transmitter's purpose is to accumulate and store a segment of the voice signal within the radio and then broadcast a time compressed representation of that signal. The speech signal is passed through a low pass filter 110 and then sampled with an analog sample/hold circuit 111. The bandwidth of the filter 110 should be at least 3 kHz to pass a sufficient part of the voice spectrum, and be less than twice the sample rate of the sample/hold circuit 111 to satisfy the Nyquist sampling criteria and prevent aliasing. The voice samples are passed to an analog storage device 112 until an entire voice segment has been sampled. The samples are then clocked out of the storage device 112 to another sample/hold circuit 113 at a much higher rate. Low pass filter 114 if set to have a frequency cutoff of greater than the wideband voice signal but less than half the high speed sample rate to removed the aliased components of the signal. The wideband voice signal is then modulated to radio frequency using a single sideband (SSB) modulator 115, boosted in strength by a power amplifier 116, filtered through a bandpass filter 117 to remove any out of band components, and broadcast through an antenna 118.

The receiver performs the opposite functions of the transmitter—accumulating the compressed packet internally and then expanding the signal in time to recover the original voice. To prepare for an incoming packet, switch 119 disconnects the antenna 118 from the power amplifier 116 and connects it to a low noise amplifier 120. The signal for the antenna is then bandlimited by the bandpass filter 117, boosted in power by the amplifier 120, and demodulated by single sideband demodulator 121. The signal is then passed through a low pass filter 122, which has the same passband filter 114, sampled by a sample/hold circuit 123 and stored in an analog storage device 124. Sample/hold circuit 125 continuously clocks samples out of storage device 124 at the slow sample rate to restore the signal to its original bandwidth. A low pass filter 126, with the same passband as filter 110, removes the aliased components of the output signal.

A common sample clock 127 generates the high rate sample frequency for both the transmitter and receiver. Frequency divider 128 reduces the high sample rate to the low sample rate by dividing clock 127 by the compression factor. A common RF signal source 129 generates the carrier for both the single sideband modulator and demodulator.

Figure 11:
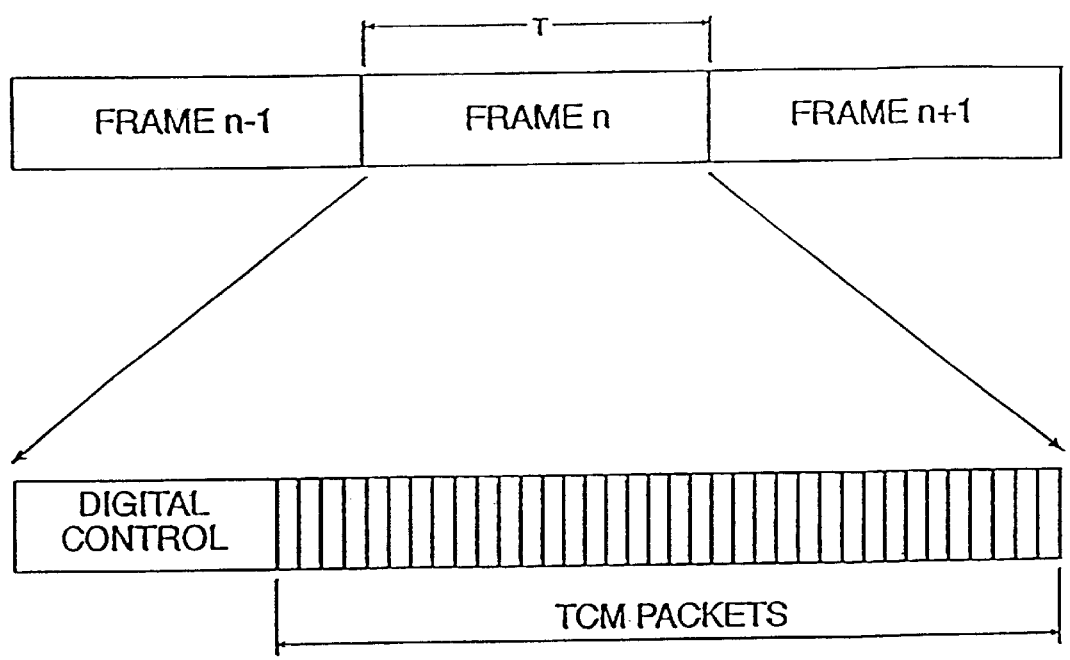
FIG. 11 shows the structure of the time frame including digital control section and analog TCM section for the preferred embodiment of FIG. 9.

Microcontroller 130 coordinates the sequence of events required to transmit and receive the voice signal. The microcontroller communicates with a corresponding microcontroller in the other radio set via a digital transceiver 131 through the same radio channel that carries the voice. This transceiver must provide a robust, low data rate connection through the multipath distortion of the wideband radio channel. A simple, fixed code, direct sequence spread spectrum transceiver is one example of a modulation format that would fit these needs. The digital control information—which includes call setup, termination, and handoff, plus any other digital services that are provided by the system—is time multiplexed with the analog signals as shown in FIG. 11. The system time is divided into a series of frames, where each frame is exactly the length of an uncompressed voice segment, T. Part of this frame is dedicated to digital connections between the various radios in the system and the rest of the time is used for the time compression multiplexed voice packets. Switch 132 controls whether the signal transmitted is an analog voice signal or a digital control signal.

The digital channel is also utilized to provide synchronization and power control information to the microcontroller 130. Placing the TCM voice packets at fixed offsets from the start of the digital control signal allows the digital demodulator's synchronization circuit to act as a time reference to the analog signals. If both the transmitting and receiving radio sets use the same offset, the short received packets will be sampled at the correct times. The digital channel also provides a means to measure the incoming signal power and correct for the changing path loss with automatic gain control. While it is possible to get an accurate measurement of the radio path loss by observing the signal strength of the digital signal, the same is not true of the analog signal. There is no component in the voice that can act as a constant power reference. However, since the analog and digital signals share the same radio channel, measuring the power level of the digital signal alone allows the microcontroller 130 to adjust the gain of input amplifier 120 so the power level is appropriate for both signals.

For the two digital transceivers to synchronize, their sample clocks must be adjusted to run at exactly the same frequency. This property is exploited to regenerate the frequency of the radio carrier by extracting the sample clock from the digital transceiver 131 to act as a reference frequency for the RF signal source 129. The RF signal sources in the two radio sets must provide reasonable enough accuracy without the reference signal to allow the digital transceivers to perform initial synchronization. Then, once synchronization is obtained, the RF sources in each radio both have the same reference frequency and can use that to generate RF carriers with almost identical frequencies.

Figure 12A:
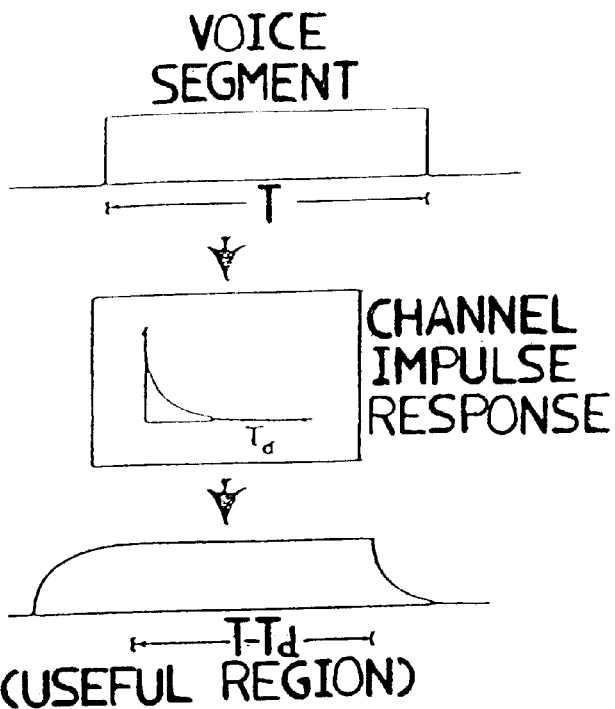
FIG. 12A shows the effect of the channel of an ordinary voice segment for the embodiment of FIG. 9.
Figure 12B:
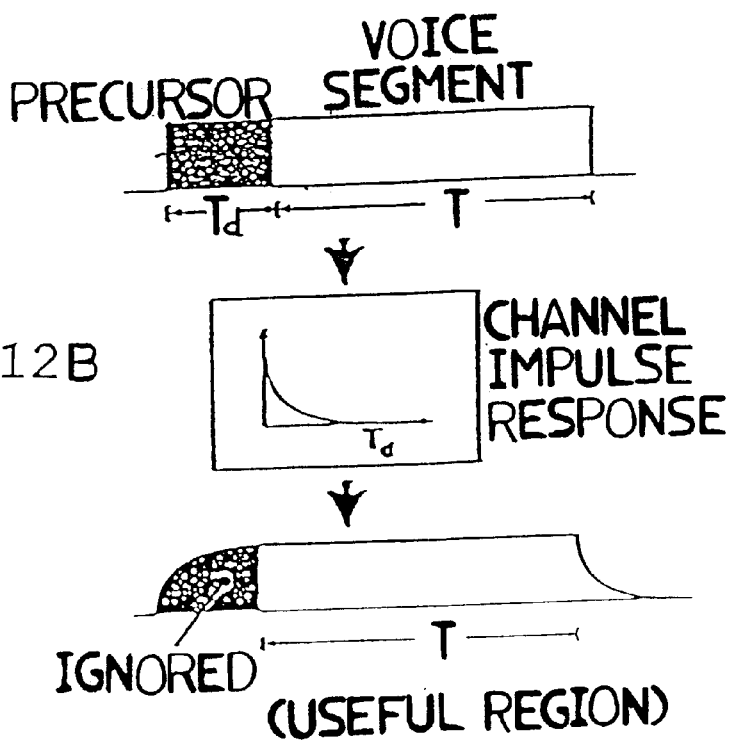
FIG. 12B shows the effect of the channel on a voice segment with the appropriate precursor for the embodiment of FIG. 9.
Figure 12C:
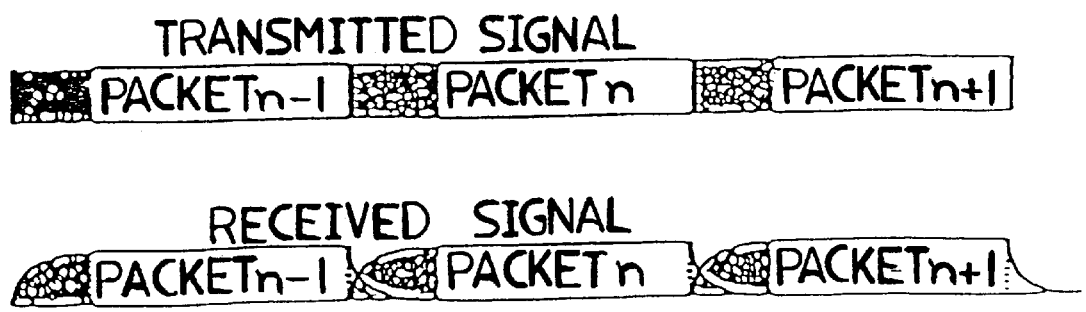
FIG. 12C shows how transmitted voice packets can be transmitted without interference for the embodiment of FIG. 9.

Edge effects are generated when a segment voice signal is sent through a multipath channel. If left uncorrected, these will cause part of the voice signal to be lost. FIG. 12a demonstrates the process by using a rectangle to represent a voice segment of length T. The delay spread of the channel causes the signal to spread out by $T_d$ seconds so there is part of the signal missing near the beginning of the received segment and an extra signal tail added to the end. The edge effects reduce the usable part of the voice segment to $T-T_d$ seconds. To overcome this problem, a precursor is added to the beginning of each voice segment as shown in FIG. 12b. The precursor consists of the last $T_d$ seconds of the previous voice segment. The precursor is discarded at the receiver, however it does serve its purpose to move the edge effect away from the beginning of the true voice segment. The useful part of the voice segment is now T seconds long, which is enough to be reassembled back into a continuous voice signal. Since the precursors are ignored at the receiver, they also serve as effective guard periods. As demonstrated in FIG. 12c, the precursor makes it possible to have TCM voice packets spaced very close in time. The packets at the receiver will overlap, but only in the precursor region which is ignored. This eliminates the usual empty guard time in TCM systems and improves system throughput.

Figure 13:
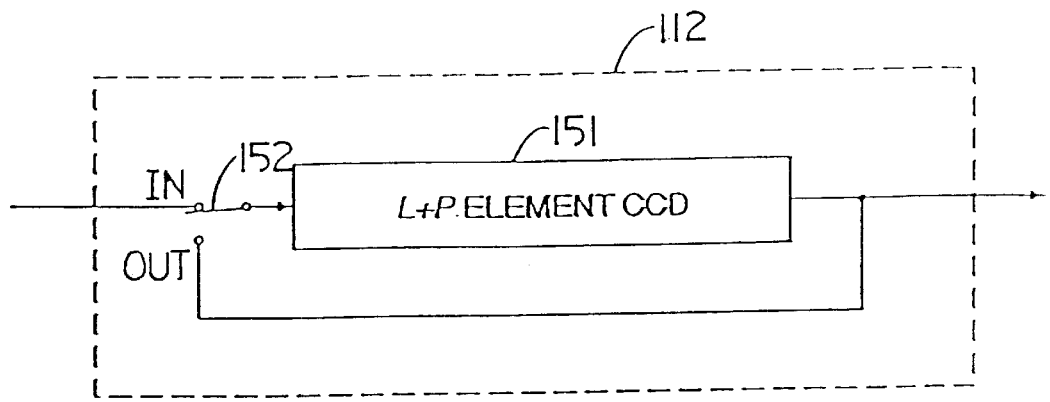
FIG. 13 shows the schematic of the transmitter's storage unit for the embodiment of FIG. 9.

The precursor is generated in the storage device 112, shown in detail in FIG. 13. The storage device uses an array of charged coupled devices (CCD) 151, which is the modern integrated circuit equivalent to the gated capacitor storage unit used by Flood et al. ["Gated Capacitor Store for T.C.M. Transmission", Proceedings of the IEEE, vol. 111, no. 4, pp. 669–674, April 1964]. The CCD array acts as an analog shift register with a number of elements. Each time that a clock signal arrives at the array, a new sample is added to the first element, and each other element is shifted one position towards the end of the array. The output of the array is equal to the value in the last element of the array. If a voice segment consists of L analog samples, and the required precursor contains P samples, then the CCD array must contain L+P elements in order to hold the entire transmitted packet. To pass the contents of the array to the high speed sample/hold circuit 113, the microcontroller first sets switch 152 to the "OUT" position. The samples are then clocked out of the array and passed to both the high speed sample/hold circuit 113, and back to the input of the array. The feedback path ensures that the array is returned to its original state after all L+P elements are clocked out. In the time between output bursts, switch 152 is moved to the "IN" position and L new samples are clocked in from the slow speed sample/hold circuit 111. The new samples displace all but the last P samples from the previous segment. These samples become the precursor for the new packet. The compression factor of hyperactive chipmunk modulation is so large that normally the entire contents of the array can be clocked out in the time between slow speed samples. If, however, a voice sample does arrive while the high speed packet is being clocked out, the microcontroller simply has to delay clocking the new sample into the array until the output burst is done and switch 152 is returned to the "IN" position.

Figure 14:
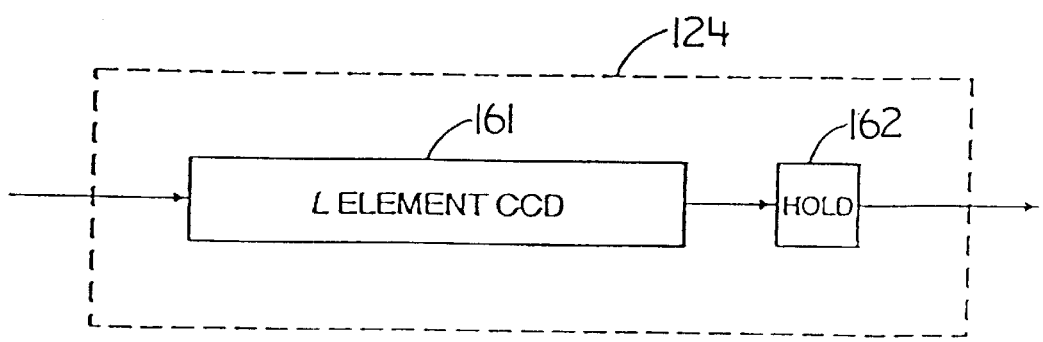
FIG. 14 shows the schematic of the receiver's storage unit for the embodiment of FIG. 9.

The details of the receiver storage device 124 are shown in FIG. 14. In the receiver, the precursor is ignored so the CCD storage array 161 need only have L elements to hold the signal. In preparation for an incoming radio packet, the microcontroller activates the hold device 162, which holds the last sample of the analog array in case the slow speed sample/hold circuit 125 requires a new sample while the high speed circuit is clocking samples into the array. Immediately after the precursor arrives from the transmitter, a total of L new samples are clocked into the CCD from the high speed sample/hold device 123. The hold device 162 is deactivated when the CCD is full, making it transparent to the circuit and allowing the slow speed sample/hold circuit 125 to continue clocking samples directly from the CCD array.

Some of the design requirements of the hyperactive chipmunk system will now be discussed.

A critical design parameter, the compression factor, must be chosen so that the range of delay spread in the multipath radio environment is transformed to the range of delay spread in the natural acoustic environment. Small compression factors are undesirable since the signal will show narrowband behaviour including flat fading if the bandwidth is too small. With too large a compression factor, the impulse response of the radio channel may be spread out too far during expansion. This makes the multipath echoes noticeable to the listener, as if the conversation were held in a large empty room or cave. Subjective testing is required to find the maximum practical compression factor for a given application without the delay spread becoming objectionable.

Although single sideband (SSB) modulation is the preferred modulation method due to its linearity and bandwidth efficiency, other methods are possible. Double sideband (DSB) modulation is another linear modulation scheme that will work with preferred embodiments of hyperactive chipmunk modulation, but with only half the bandwidth efficiency. DSB modulation also results in a poorer signal to noise ratio than SSB for a given transmit power. This is different from the common narrowband case where SSB and DSB modulation produce the same SNR [6]. The difference comes in the way that the upper and lower sidebands combine within the DSB receiver. With narrowband systems, the upper and lower sidebands fall within the coherence bandwidth of the radio channel and combine coherently within the receiver. In this wideband system, the sidebands are separated by more than the coherence bandwidth of the channel and must be treated as independent stochastic signals and combined non-coherently. Non-coherent combining results in only about half the signal energy of coherent combining therefore wideband DSB receivers suffer a 3 dB SNR penalty. Wideband SSB receivers do not combine sidebands and are not subject to this penalty. Vestigial sideband (VSB) modulation is another effective modulation technique, however it suffers the same bandwidth and SNR penalties as DSB, to a lesser degree.

Whether SSB, DSB, or VSB is used, the carrier tone must be suppressed. Since the carrier tone is a narrowband signal, it is susceptible to flat fading and there is no guarantee that it will make it to the receiver. Therefore, transmitting such a tone within a spread spectrum signal is an unnecessary waste of power. Amplitude modulation requires a carrier tone so it is not suitable for hyperactive chipmunk modulation. Non-linear modulation techniques such as frequency and phase modulation do not preserve the multipath distortion characteristics of the channel and sound unnatural.

In order to transmit the signals, the linear power amplifier 116 must be able to handle relatively high powers for short duty cycles. For example, to transmit an average power of 10 mW with a compression ratio of a thousand, the radio actually transmits 10 W with a 0.1% duty cycle. The power amplifier should be able to quickly go in and out of low power standby mode, under control of the microcontroller 130, to conserve energy between packets.

The length of the voice segments is limited by the allowable delay through the system and the length of the precursors. As shown in FIG. 9, the delay through the system is roughly the length of an uncompressed voice segment. To keep the two-way delay reasonable for a normal conversation, the voice segment length should be less than 100 ms. At the other extreme, excessively shortening the segment length causes bandwidth efficiency to suffer as the precursor consumes a larger percentage of transmission time.

I claim:

1. A telecommunications network, in which the telecommunications network uses TDMA frames, each TDMA frame being divided into a series of time slots, and each time slot being divided into sub-slots, comprising:

plural active terminals and plural passive terminals;

each active terminal comprising an rf section, a transceiver, a synchronizer and a signal router, each of the transceiver, synchronizer and signal router being operably connected to the rf section for transmitting and receiving signals from the active terminal;

each signal router being configured to receive a signal in a sub-slot and re-broadcast the signal in a subsequent sub-slot when the measured energy in the signal exceeds a threshold; and each passive terminal comprising a transceiver and synchronizer and not having a signal router.

2. The telecommunications network of claim 1 in which the subsequent sub-slot is the next adjacent sub-slot in time.

3. The telecommunications network of claim 2 in which each signal router is configured to re-broadcast a signal once during any given slot.

4. The telecommunications network of claim 3 in which the signal router is configured to prevent re-broadcast of signals across slot boundaries.

5. The telecommunications network of claim 1 in which the transceiver outputs a wideband signal.

6. A terminal for a telecommunications network, in which the telecommunications network uses TDMA frames, each TDMA frame being divided into a series of time slots, and each time slot being divided into sub-slots, the terminal comprising:

an rf section, a transceiver for transmitting signals, a synchronizer for synchronizing the terminal with respect to TDMA frames, and a signal router, each of the transceiver, synchronizer and signal router being operably connected to the rf section for transmitting and receiving signals to and from the terminal; and the signal router being configured to receive a signal in a sub-slot and re-broadcast the signal in a subsequent sub-slot when the measured energy in the signal exceeds a threshold.

7. The terminal of claim 6 in which the subsequent sub-slot is the next adjacent sub-slot in time.

8. The terminal of claim 7 in which the signal router is configured to re-broadcast a signal once during any given slot.

9. The terminal of claim 8 in which the signal router is configured to prevent re-broadcast of signals across slot boundaries.

10. The terminal of claim 8 in which the transceiver outputs a wideband signal.

11. A synchronizer for a terminal in a telecommunications system, comprising:

a reference clock;

a signal detector having as input signal sources outside of the terminal;

an offset calculation unit connected to each of the reference clock and the signal detector and having as output a signal representing timing error;

a feedback loop responsive to the timing error for adjusting the reference clock to force the timing error to zero;

a synchronization signal generator responsive to the reference clock; and a controller configured to advance the synchronization signal by an amount that increases as the frequency of the reference clock decreases.

12. A method of routing signals in a telecommunication network, in which the telecommunications network comprises plural terminals, and in which the telecommunications network uses TDMA frames, each TDMA frame being divided into a series of time slots, and each time slot being divided into sub-slots, the method comprising the steps of:

transmitting a signal from a first terminal in a first sub-slot; and receiving the signal at other terminals in the network in the first sub-slot and re-broadcasting the signal in a sub-slot subsequent to the first sub-slot.

13. The method of claim 12 in which the subsequent sub-slot is the next adjacent sub-slot in time.

14. The method of claim 13 in which the terminal re-broadcasts a signal once during any given slot.

15. The method of claim 14 in which the terminal prevents re-broadcast of signals across slot boundaries.

16. The method of claim 12 in which the terminal outputs a wideband signal.

17. A method of synchronizing a telecommunications network, in which the telecommunications network comprises plural terminals, and in which the telecommunications network uses TDMA frames, each TDMA frame being divided into a series of time slots, and each time slot being divided into sub-slots; the method comprising repeating, from time to time, the steps of:

combining synchronization signals at each of plural terminals in the network where the synchronization signals are received from terminals in the network; and adjusting a reference clock at each of the plural terminals to reduce timing offset of the reference clock from the combined synchronization signals.

18. The method of claim 17 further comprising the step of:

advancing synchronization signals transmitted by the terminals in the network by an amount that increases as the frequency of the respective reference clocks decreases.

19. The method of claim 18 in which combining the synchronization signals comprises the steps of:

forming a magnitude-delay profile of the received signals; and calculating a representative value of the magnitude-delay profile.

20. The method of claim 19 in which the representative value is the centroid of the magnitude-delay profile.

21. The method of claim 17 in which terminals in the network either combine synchronization signals or transmit synchronization signals but not both.

22. The method of claim 21 in which the terminals that combine synchronization signals are selected randomly from time to time from the terminals in the network.

23. The method of claim 22 in which a synchronization signal received for combination at a terminal is rejected when the power level of the synchronization signal falls below a threshold.

24. The method of claim 21 in which transmission of synchronization signals by a terminal in the network is stopped when the level of the synchronization signal received for combination at the terminal exceeds a threshold.

* * * * *